May 7, 1968     T. TSCHUDI     3,381,669

ROTARY INTERNAL COMBUSTION ENGINE

Filed Oct. 31, 1966     4 Sheets-Sheet 2

INVENTOR.
TRAUGOTT TSCHUDI
BY Agent

May 7, 1968 T. TSCHUDI 3,381,669
ROTARY INTERNAL COMBUSTION ENGINE
Filed Oct. 31, 1966 4 Sheets-Sheet 3
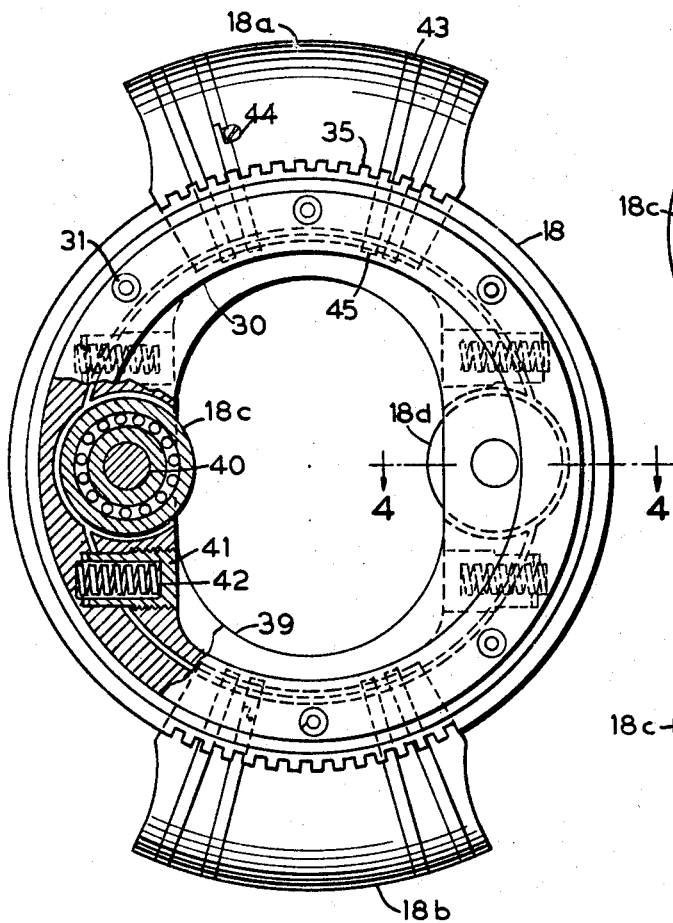
FIG. 3
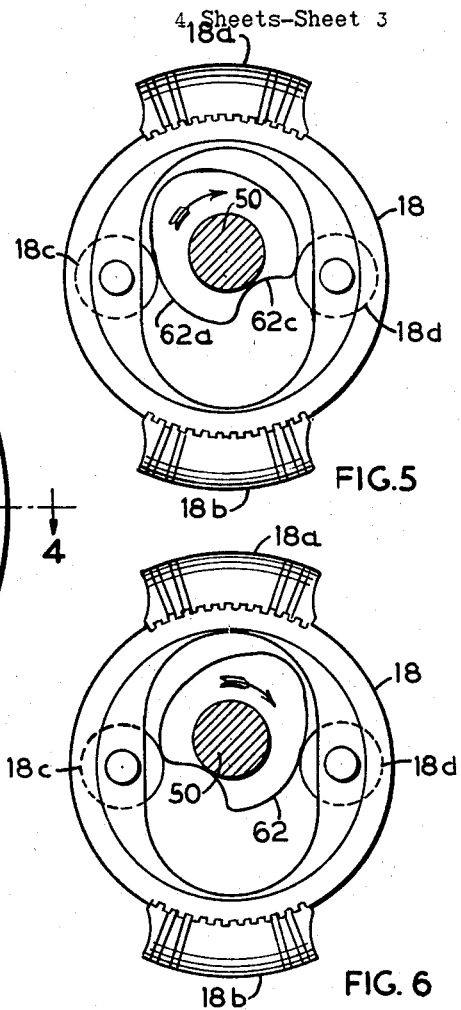
FIG. 5
FIG. 6
FIG. 7
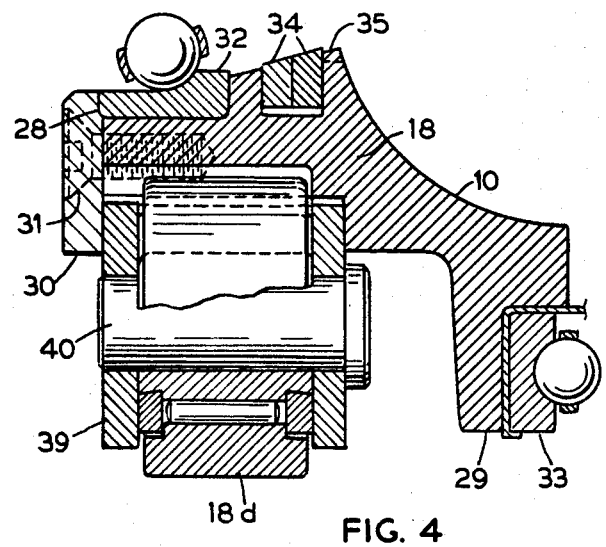
FIG. 4
INVENTOR.
TRAUGOTT TSCHUDI
BY
AGENT May 7, 1968     T. TSCHUDI     3,381,669
ROTARY INTERNAL COMBUSTION ENGINE
Filed Oct. 31, 1966     4 Sheets-Sheet 4

INVENTOR.
TRAUGOTT TSCHUDI
BY
AGENT

United States Patent Office 3,381,669
Patented May 7, 1968

3,381,669
ROTARY INTERNAL COMBUSTION ENGINE
Traugott Tschudi, Flushing, N.Y., assignor to Tschudi
  Engine Corporation, Flushing, N.Y.
Filed Oct. 31, 1966, Ser. No. 590,918
9 Claims. (Cl. 123—11)

The present invention relates to a valveless four cycle rotary combustion engine, and more particularly to improvements in the type of engine disclosed in my U.S. Patents No. 1,641,911, of Sept. 6, 1927, No. 1,732,995, of Oct. 22, 1929, and No. 2,734,489, of Feb. 14, 1956.

Briefly and generally stated, this type of engine comprises an engine block and a pair of mating rotors coaxially mounted in the stationary engine block for rotation in respect thereto, and the engine block and the rotors together defining a toroidal chamber. A drive shaft extends transversely of the toroidal chamber and has an axis parallel to the axis of the engine block but being eccentric in relation thereto. A pair of diametrically opposite pistons is fixed to each rotor and arranged for revolving movement in the toroidal chamber, the pistons subdividing the chamber into four compartments. A cam drive is provided to move the pistons of each rotor in respect of the drive shaft to vary the size of the compartments, thereby successively and in timed sequence effecting the intake of gaseous fuel, the compression of the fuel, the ignition of the compressed fuel, and the exhaust of the combustion gases, twice per revolution of the drive shaft.

It is one primary object of the present invention to improve the cam drive so that the compression cycle is elongated and the pressure from the fuel intake port to the ignition is gradually increased in the compression chamber. In this manner, the homogenizing of the fuel is improved and, also, the expansion cycle is conversely elongated so that the expansion of the ignited fuel is continued to atmospheric pressure and the thermal efficiency of the engine is increased without adding additional energy in the combustion process. The emission of unburned hydrocarbons is thereby reduced, with a consequent lessening of air pollution now so prevalent in traffic-choked cities.

It is another important object of this invention to provide for yielding engagement between the cam drive and the cam follower means on the rotors to adjust for minor misalignments due to bending of the eccentrically positioned drive shaft which carries cams, thus assuring positive and continuous engagement between the cams and the cam followers, and providing a smooth and noiseless engine operation.

It is also an object of the invention to provide grooves on the annular faces of the rotors to permit full circumferential expansion of piston rings mounted on the pistons.

With these and other objects in view, the invention provides a rotary internal combustion engine which is simple in construction, economical and practical to manufacture with the use of conventional machine tools, low in weight, easy to service, and one that will reduce air pollution by means of an elongated compression and combustion cycle, including scavenging of the combustion gases. The mechanical system is completely self-balanced without the need of counterweights. The pistons and all the moving parts are friction-free.

Merely by way of example and not to delimit the scope of the invention, which is defined by the appended claims, the present invention will be particularly described in connection with one embodiment, taken in conjunction with the accompanying drawing wherein FIG. 1 is a vertical transverse section of the engine, taken along line 1—1 of FIG. 2;

FIG. 3 is an elevational front view of a rotor;

FIG. 4 is an enlarged sectional view showing the mounting of the cam followers on the rotor, taken along line 4—4 of FIG. 3;

FIGS. 5, 6 and 7 are diagrammatic views showing a rotor and the associated cam drive in successive operating cycles;

Figures 1, 11:
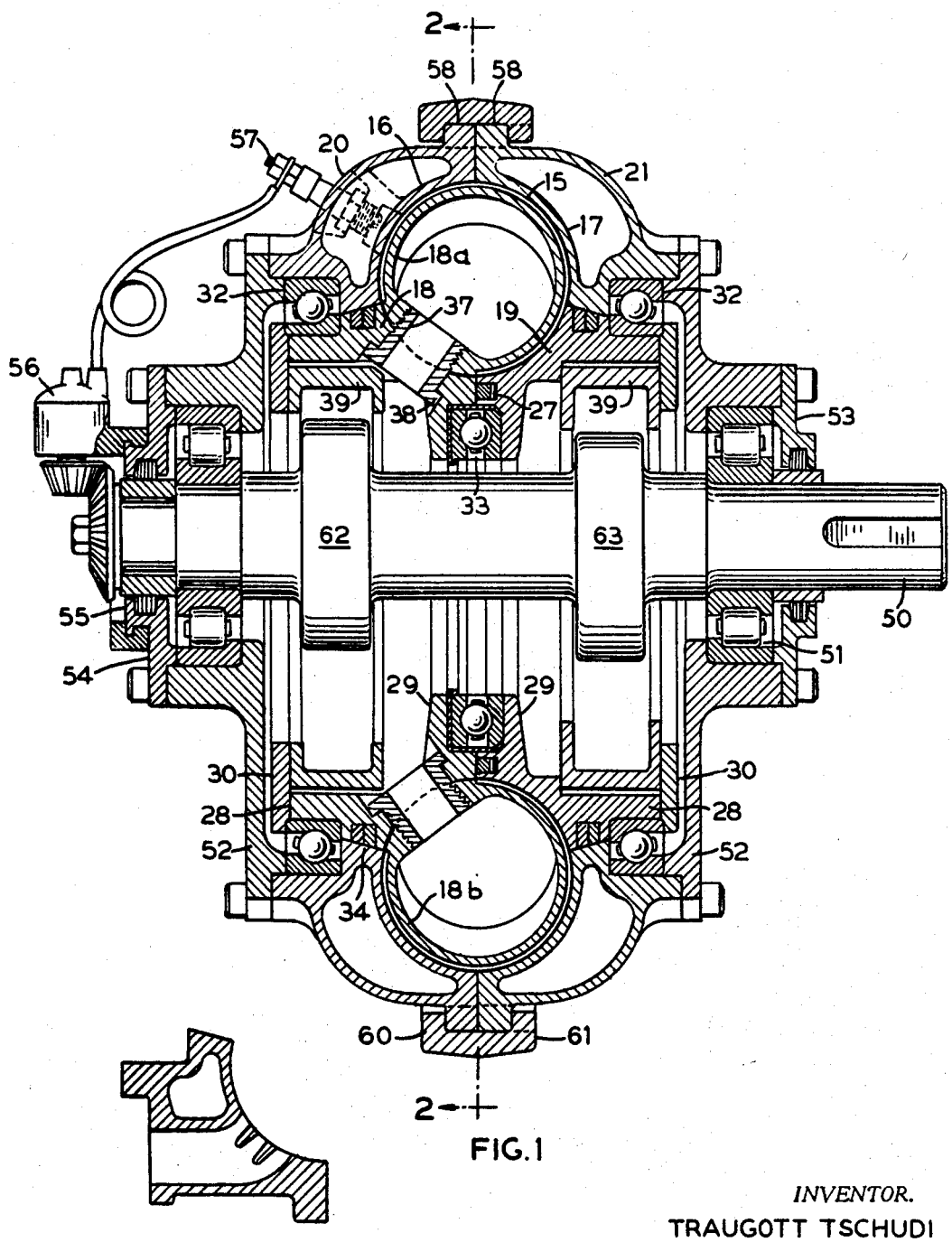
FIG. 11 is a detailed fragmentary sectional view taken approximately along line 11—11 of FIG. 2 and illustrating the construction of the fuel intake, exhaust and scavenging ports.

Referring now to the drawing and more particularly to FIG. 1, the internal combustion engine shown therein by way of example comprises an engine block and a pair of rotors 18, 19 together defining a toroidal chamber 15, each rotor carrying a pair of diametrically opposed pistons 18a, 18b and 19a, 19b, respectively. The pistons are arcuately shaped in conformity to the toroidal chamber and are mounted for rotation in the chamber, driving the same into four annular engine compartments 46, 47, 48 and 49.

In the illustrated embodiment, the stationary engine block consists of a pair of mating engine block parts 16, 17 which may be readily assembled and disassembled by means of clamping ring 59 in a manner to be described hereinafter. Respective watercooling jackets 20, 21 are formed integrally with each engine block part and extend circumferentially thereof.

Figures 2, 12:
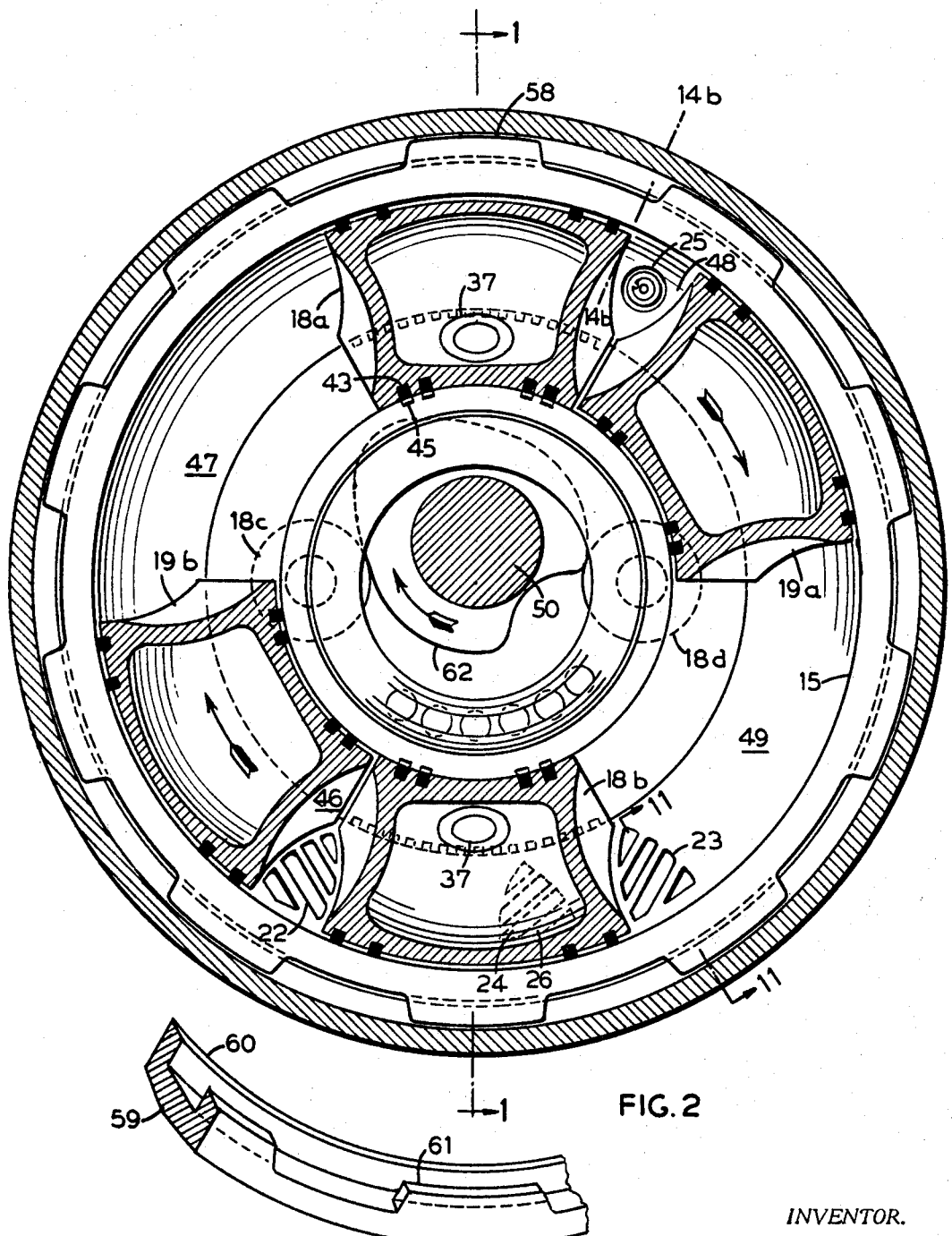
FIG. 2 is a sectional view of the engine, taken along line 2—2 of FIG. 1.
FIG. 12 is a fragmentary perspective view of a locking ring for fastening engine parts together.

The engine block has an intake port 22 for gaseous fuel, which is shown to be in engine block part 16 which also has the exhaust port 23, a scavenging air outlet port 24, and a tap for ignition device 25 (see FIG. 2). The scavenging air inlet port 26 is located in engine block part 17 opposite to port 24. FIG. 11 illustrates the cross section of ports 22, 23, 24 and 26.

While the fuel intake and exhaust ports are illustrated in a position adjacent the respective ends of a piston (18b in FIGS. 2 and 8) held momentarily against movement in relation to the drive shaft, this showing merely facilitates a ready understanding of the four-cycle engine operation. If these ports, together with the scavenging air ports, are located in the engine block at respective positions somewhat advanced in a clockwise direction, so that the fuel intake port 22 is somewhat ahead of the momentarily arrested piston during the operation of the engine, the engine will have a higher expansion than compression ratio, whereby the engine will perform as an idealized complete expansion engine.

The two rotors 18, 19 are identical, except that one rotor, i.e. rotor 19 in the illustrated embodiment, has a groove accommodating sealing ring 27. Thus, while rotor 18 is specifically described and illustrated in FIGS. 3–7, this description also applies to rotor 19 which, therefore, has been provided with corresponding reference characters to designate like parts.

Each rotor has an annular rim portion 29 and the rotors are so assembled that the rim portions 29 face each other in mating relationship, with thrust bearing 33 interposed between the rim portions of the rotors. While one of the facing surfaces of the rim portions 29 is flat, the other one has a circumferentially extending groove accommodating sealing ring 27. A suitable spring means, such as a corrugated spring in the groove, forces the sealing ring 27 against the flat surface of the mating rim portion of the other rotor.

An annular rim 28 extends outwardly from rim portion 29 and carries a ring 30 secured to the rim by flat head machine screws 31. The rim 28 and rim portion 29 together have an arcuate wall 10 which is complementary to a like wall of the engine block to form toroidal chamber 15. Self-expanding compression sealing rings 34 are mounted in a circumferential groove in a face of rim 28 which mates with a face of the stationary engine block. Sealing rings 27 and 34 provide a satisfactory seal of the toroidal chamber 15 to prevent escape of fuel therefrom but this seal may be further improved by serrations 35 in the fissures between the sealing rings and the wall 10 along that portion of rotor rim 28 which is contacted by the pistons, the serrations adjacent sealing rings 34 being shown in FIG. 4. The object of these serrations is to provide a friction-free seal against rapid pressure impulses that are generated in the compression and combustion chamber during operation of the engine. Gas escaping across these fissures is subjected at each cavity to sudden expansion and alternatively, while passing from one cavity to the next, to sudden constriction; this results in a series of pressure reductions. Further sealing improvement will be achieved by providing the sealing rings with protrusions engaging the depressions in the serrations to obtain a pressure seal.

Each rotor is mounted in the engine block by means of ball bearings 32 for rotation about the axis of the engine block, the mating rotors being coaxially mounted, with the rim portions 29, rims 28 and rings 30 being concentrically arranged about the engine block axis, and the mating walls of the stationary engine block and of the rotors defining the sealed toroidal chamber 15, this engine assembly being most clearly shown in FIG. 1.

Describing the substantially identical rotors with reference to rotor 18, the rotor carries a pair of diametrically opposed, arcuate, hollow pistons 18a, 18b. The pistons are rigidly secured to the rotor by means of tubular fastening elements 37. As shown in FIG. 1, each piston has a thickened wall portion and an inner end of fastening element 37 threadedly engages this wall portion of the piston while an outer end of the fastening element has an annular flange 38 engaging a mating shoulder in rotor parts 28, 29. In this manner, the piston fastening element serves also as a conduit for oil to enter the interior of the hollow piston to aid in cooling the same.

As FIG. 1 also shows, while the thickened wall portion of the pistons in contact with the wall 10 of the rotor parts 28, 29 has a radius equal to the bore radius of toroidal chamber 15, the radius of the outer piston walls which move in relation to the stationary engine block wall defining the toroidal chamber is slightly reduced to provide a clearance between the moving pistons and the stationary engine block. This clearance eliminates friction and wear of the pistons.

In addition to the pair of diametrically opposed pistons, each rotor also carries a pair of diametrically opposed cam followers, the cam followers being offset by 90° in respect to the pistons. The mounting of the cam followers is best shown in FIGS. 3 and 4. Each cam follower 18c, 18d is a roller mounted on roller bearings on arbor 40 which is journaled in the side walls of bearing ring 39 of channel shaped cross section. The axis of rotation of the cam follower rollers extends in the same direction as the axis of the engine block.

According to a very important feature of the present invention, the cam followers are yieldingly mounted on the rotor for slight movement in a radial direction in relation to the axis of rotation of the rotor. The illustrated means for yieldingly mounting the cam followers on the rotor includes four hollow screws 41 attaching the bearing ring 39 of each cam follower to the rotor rim 28. A compression spring 42 is mounted in the bore of each hollow screw 41, each screw having one threaded end fixedly engaging the bearing ring 39 while its other end extends into a mating recess in rotor rim 28. A slight clearance is defined between mating walls of bearing ring 39 and rotor rim 28 so that, under the pressure of spring 42, the bearing ring and cam follower is floatingly mounted between the rotor rim and the associated cam, permitting minor sliding movements of the cam followers under the pressure of the cam, if needed. This will considerably decrease friction and wear of the rollers and the cam, and also facilitates the smooth movement of the cam in relation to the cam followers without undue torsion being exerted upon the cam drive shaft.

The pistons are preferably made of a light metal, such as an aluminum alloy, to minimize inertia forces, all pistons having the same dimensions and carrying the usual compression rings 43 so as to seal the four engine compartments from each other. The compression rings are mounted in circumferential grooves in each piston and are held therein against rotation by pins 44. Revolving in toroidal chamber 15, the movement of the pistons will cause the outer surfaces of the piston rings to take on the minute curvature of the chamber which, in the rings' cross section, will be convex at the outer periphery and minutely concave from the center line of the torus inwardly. As will be noted from FIG. 2, the piston rings will be subject to pressure only over a circumferential arc of about 275° while the dormant circumferential arc of about 85° over the toroidal surface of the rotor will not be subject to wear.

In accordance with another important feature of this invention, the rotor surface beneath each piston ring 43 is undercut to define grooves 45 which permit free circumferential expansion of the piston rings, thus providing an improved seal between the engine compartments 46, 47, 48 and 49. As will be explained hereinafter more fully in connection with the description of the engine operation, each of the engine compartments successively and periodically varies in size as it first operates as the fuel intake chamber, when in communication with gaseous fuel intake port 22, then as the compression chamber, subsequently as the ignition chamber, when the compressed fuel is ignited and the power stroke of the expanding fuel is effected, and finally as the exhaust chamber of the spent gases, twice for each revolution of drive shaft 50.

Drive shaft 50 extends through the engine block and through the central clearing of the rotors defined by their annular rim portions 29 parallel to the axis of rotation of the rotors but eccentrically thereof so that the toroidal engine chamber 15 surrounds the drive shaft (see FIG. 1). The illustrated bearing means for drive shaft 50 includes a pair of bearing plates 52, 52 bolted respectively to the engine block parts 16, 17 and having secured thereto sealing end plates 53, 54 through which the shaft projects. Roller bearings 51, 51 support shaft 50 in the engine block for rotation in respect thereto.

Drive shaft 50 has fixedly secured thereto a pair of identical cams 62, 63 so spaced along the shaft axis that one cam is in engagement with the pair of cam followers of one rotor while the other cam is in engagement with the pair of cam followers of the other rotor. In the illustrated embodiment, cam 62 cooperates with cam followers 18c, 18d and cam 63 cooperates with cam followers 19c, 19d. Thus, shaft 50 and cams 62, 63 constitute a cam drive for the synchronous revolution of the piston pairs in toroidal chamber 15 to operate the engine in accordance with the invention.

Figure 13:
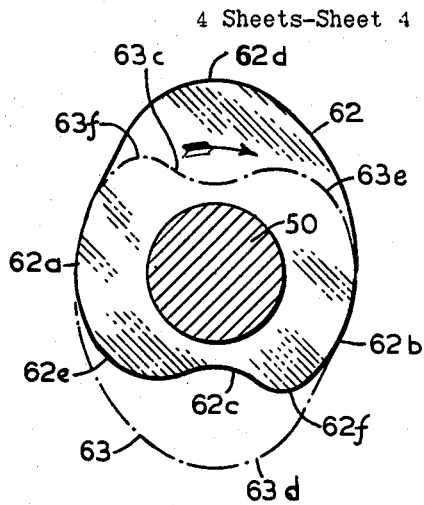
FIG. 13 is a detailed view of the cams.

The contour of the cams is critical to the operation of the cam drive according to the present invention, and is best shown in FIG. 13.

Cams 62 and 63 are identical. They are disk cams fixedly secured to shaft 50 and extending radially therefrom into engagement with the pairs of cam followers of the respective rotors. FIG. 13 shows the cams as viewed from the power take-off end of the drive shaft whose clockwise rotation is indicated by an arrow. Cam 62 is shown in full lines while cam 63 is illustrated in dash-dot lines for a better understanding of the drawing.

Each disk cam has two diametrically extending axes perpendicular to each other and intersecting at the axis of cam shaft 50, one axis of the cam being longer than the other one. As is conventional in cams of this type used in rotary internal combustion engines, the cam is asymmetrical in respect of its shorter axis but, in accordance with the invention, the cam is also asymmetrical in respect of the longer axis, as the following detailed description of the cam contour will show. To obtain the timed sequence of the drive of the two rotors, the cams are angularly offset by 180° with respect to each other so that like contour portions of the cams are diametrically opposite each other, and by this arrangement, the power shaft is dynamically balanced. Since the cams are identical, the contour thereof will be described in connection with cam 62, the same reference characters being applied to cam 63 to designate like contour portions.

The contour or cam face includes two diametrically opposed lobes 62a, 62b. These lobes are convexly contoured so that rotor 18 will be in a stationary position as long as these lobes are in contact with cam followers 18c, 18d. In other words, the lobes 62a, 62b will lock them into engagement with the cam drive so as to take the rotor 18 along. The contour also includes two diametrically opposed cam faces 62c, 62d along the longer axis of the cam. The concave index face 62c allows a respective one of cam followers 18c, 18d to move freely as this cam follower comes closest to the eccentric drive shaft 50 during revolution of the rotor 18 about the shaft, while the irregularly ovate cam face 62d contacts the diametrically opposite cam follower, in which position the rotor 18 is free of engagement with the cam drive.

In accordance with the invention, the concave index cam face 62c, which frees the rotor from the cam drive, is connected to the faces 62c, 62d of the cam, which lock the rotor to the cam drive, by convex dwell faces of different lengths. As shown, the dwell face 62e, which precedes the index 62c in the direction of rotation of the cam, is substantially longer than the dwell face 62f which follows the index.

As will be apparent from a consideration of FIGS. 5–7, this contour of the cam elongates the compression and power stroke, as will be more fully explained hereinafter in connection with the description of the engine operation. While the cam lobes 62c, 62d lock cam follower rollers 18c, 18d (FIG. 5), as the cam shaft 50 rotates in the direction of the arrow, rotor 18 remains stationary in relation to the shaft. As dwell face 62e is rotated into engagement with cam follower 18c (FIG. 6), the cam remains locked between the pair of diametrically opposed cam followers 18c, 18d, and the torsion of the rotating cam drive further moves the rotor, taking it along into the position shown in FIG. 7, at which point the cam follower 18c is about to enter into concave index face 62c to begin the power stroke.

In the illustrated embodiment of the rotary internal combustion engine, the two mating engine block parts 16, 17 are assembled by means of a fastening device which makes it very simple and easy rapidly to take the engine apart without tools. As shown, each engine block part has a mutilated flange 58 to enable the parts to be clamped together by a ring 59, which is more clearly shown in FIG. 12. Clamping ring 59 includes a continuous rim 60 and a mutilated rim 61. The contacting surfaces of continuous rim 60 and engine block part 16 are flat, whereas the contacting surfaces of mutilated flange 58 on engine block part 17 are radially wedge-shaped. Upon assembly, the ring 59 is turned so as to tighten the wedges, thus providing a bolt-less means of assembling the engine block. Similar assembling means may be used for mounting bearing plates 52 on the engine block parts and end plates 53, 54 on the bearing plates, instead of the illustrated bolts.

As shown in FIG. 1, end plate 54 has a circular track 55 which carries a rotatable mounting base for an ignition distributor or magneto 56. This device is provided for adjusting the ignition timing of spark plug 57 extending into tap 25, in relation to the movement of a compressed fuel charge towards the spark plug while the engine is in operation.

Figure 14:
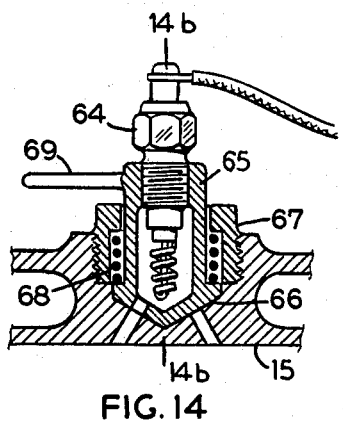
FIG. 14 shows a preferred ignition device.
Figure 14A:
FIG. 14a illustrates an arrangement of engine block holes cooperating with the ignition device of FIG. 14.

FIGS. 14 and 14a show a glow plug 64 to be substituted for the conventional spark plug ignition system. Glow plug 64 is an electrical device with a heating element extending into a housing 65 having a conical base with a shoulder 66. A threaded bushing 67 fastens the housing 65 to the engine block, an annular cavity being defined between the inner bushing wall, the outer housing wall and the shoulder 66, and a helical spring 68 in this cavity pressing the glow plug housing tightly against bore means in the engine block. Housing 65 has a single port, whereas the bore means in the engine block includes a series of holes arranged to define a cone.

A handle 69 is attached to the upper end of the glow plug housing and when the housing is turned by the handle, the housing port will be in communication with different ones of the engine block holes so that the glow plug will spark the compressed charge of gaseous fuel at various points within a distance of several degrees of piston travel. With the glow plug assembly having as its center the line 14b–14b, as shown in FIG. 2, it is possible to pre-ignite the fuel in the same manner as with the conventional electric distributing system. But with this simplification, the entire unit will be even more economical in manufacturing cost, performance and maintenance.

Figure 8:
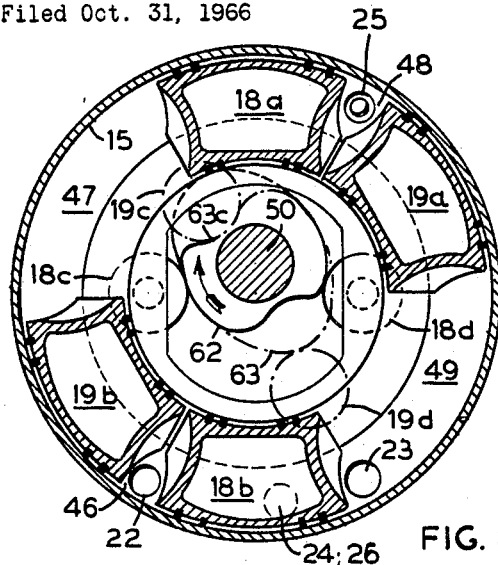
FIGS. 8, 9 and 10 are similar diagrammatic views showing the pistons in the toroidal engine chamber in the successive operating cycles.
Figure 9:
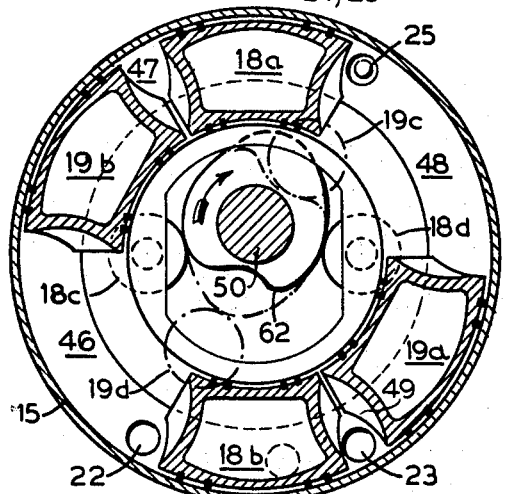

The operation of the internal combustion engine will be obvious from the above description of its structure and will now be summarized for a fuller understanding:

Assuming the engine has been started electrically so that there is an intake of gaseous fuel through port 22 and the rotors are in the position shown in FIG. 8 (see also FIG. 5), with cam shaft 50 rotating at constant speed in a clockwise direction. As shown, pistons 18a, 18b are at vertical center and cam followers 18c, 18d are in contact, respectively, with diametrically opposed cam lobes 62a, 62b of cam 62 at horizontal center at points 90° removed from the respective pistons of rotor 18. As long as cam followers 18c, 18d remain in contact with lobes 62a, 62b, they lock the rotor 18 into position against rotation in respect of shaft 50. Thus, the rotor and its pistons 18a, 18b move with the shaft but not in relation thereto. At the same time, the cam follower 19c of rotor 19 rests in concave index face 63c of cam 63 while cam follower 19d remains unobstructed by diametrically opposed cam face 63d. While cam followers 19c, 19d are in contact with concave index face 63c and ovate cam face 63d, respectively, the rotor 19 is free to move in relation to the cam shaft 50, and it is so moved when the compressed charge of fuel in compartment 48 is ignited by device 57 or 64, thereby imparting a power impulse to piston 19a. This power impulse is transmitted to cam shaft 50 through piston 19a, fastening element 37, rotor rim 28, hollow screws 41, bearing ring 39, cam followers 19c, 19d and cam 63, in the order named. The ignited compressed fuel charge in compartment 48 pushes pistons 19a, 19b of rotor 19 through an arcuate path of about 50°, the arcs of cam lobes 62a, 62b being of corresponding length to remain in locked engagement with cam followers 18c, 18d to hold rotor 18 stationary in relation to shaft 50 while rotor 19 moves into the position shown in FIG. 9 (see also FIG. 6). During this period and for some distance thereafter, compartment 46 in registry with intake port 22 receives a charge of gaseous fuel, the fuel charge in compartment 47 is simultaneously compressed, and the spent gases in compartment 49 leave the engine block chamber through exhaust port 23. The movement of rotor 19 from the position shown in FIG. 8 to that illustrated in FIG. 9 is instantaneous upon ignition of the charge in compartment 48, the above-described fuel charge, compression and exhaustion taking place simultaneously.

Figure 10:
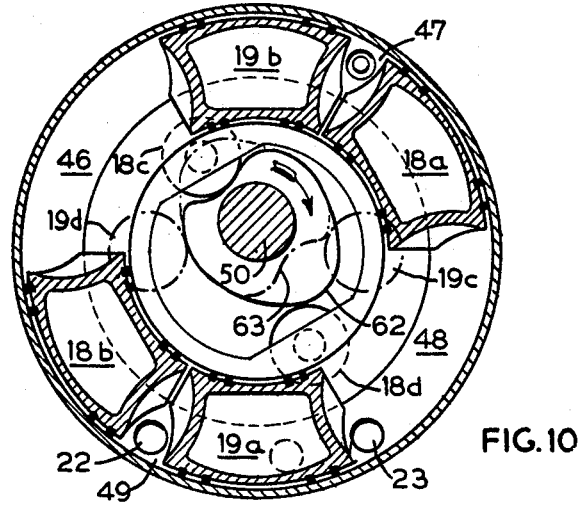

At this stage, cams 62 and 63 have begun to move from the position shown in FIG. 9 to that of FIG. 10, i.e. cam follower 19c has moved out of the concave index face 63c onto the short cam dwell face 63f while cam follower 19d is locked to lobe 63a, thus moving rotor 19 into the locked position of FIG. 10 while the rotor 18 assumes the freely rotatable position described hereinabove. In other words, the position of FIG. 10 is identical with that of FIG. 8, except that the role of the two rotors is reversed. Now, compartment 49 receives the fresh charge of fuel, the charge in compartment 46 is about to be compressed, the fuel charge in compartment 47 is about to be exploded, and the spent gases in compartment 48 are exhausted and scavenged. The power impulse in this cycle is transmitted to cam shaft 50 through piston 18a, fastening element 37, rotor rim 28, hollow screws 41, bearing ring 39, cam followers 18c, 18d and cam 62, in the order named, thus duplicating the action of rotor 19.

Thus, two power impulses are transmitted to the cam shaft 50 during each revolution, and sequentially by pistons 19a, 18a, 19b and 18b during two revolutions, to be repeated every two revolutions.

As indicated, each power stroke involves an arcuate piston movement of about 50° of one rotor while the other rotor remains stationary in relation to the drive shaft 50, with the pistons of this rotor at the vertical center. As each power stroke is completed, the pistons at vertical center begin to move since a respective one of the elongated cam dwell faces 62e or 63e gradually releases the contacting cam follower and permits rotary motion of the corresponding rotor. This results in a gradual enlargement of the combustion chamber and, therefore, elongates the expansion stroke to a travel of about 120° of the toroidal chamber, producing a more thorough combustion of the fuel and, consequently, higher engine efficiency.

While the combustion chamber is subjected to a gradual expansion, due to the asymmetrical curvature of the cam faces in respect of the longer axis of the cam, the compression cycle, which is converse to the expnsion cycle, also is elongated to the same arcuate length of about 120°, allowing the gaseous fuel charge to be homogenized more thoroughly than in conventional engines, and thus further improving the engine efficiency.

The exhaust compartment passes through a scavenging zone wherein a compressed charge of fresh air is blown through port 26 to evacuate remaining impurities from the exhaust compartment so that the same is clean when it reaches the charging station in registry with inlet port 22.

I claim:

1. In a rotary four cycle internal combustion engine comprising a stationary engine block having an axis, a pair of mating rotors coaxially mounted in the engine block for rotation in respect thereto, the engine block and the rotors together defining a toroidal chamber; a drive shaft extending transversely of the toroidal chamber and having an axis parallel to the axis of the engine block but being eccentric in relation thereto; a pair of diametrically opposite pistons fixed to each of said rotors and arranged for revolving movement in the toroidal chamber, the pistons subdividing the chamber into four compartments; a pair of diametrically opposite cam follower rollers fixed to each of said rotors and spaced angularly 90° from the pistons on the respective rotor; and a pair of identical cams fixed on the drive shaft, extending radially therefrom and so spaced along the shaft axis as to be in engagement with a respective one of the pairs of cam follower rollers, each cam having two diametrically extending axes perpendicular to each other and intersecting at the shaft axis, one cam axis being longer than the other cam axis, a concave index cam face and an ovate cam face opposite thereto along the longer cam axis, and the cams being angularly offset by 180° in respect of each other: the improvement of two cam lobes opposite each other along the shorter axis of each cam and asymmetric in respect of the longer axis.

2. The improvement in the engine of claim 1, wherein each of said cam lobes includes a dwell face merging into the concave index cam face, one of the dwell faces being longer than the other dwell face.

3. The improvement in the engine of claim 2, wherein the lobe and longer dwell face associated therewith define an arcuate path of about 120° for a respective cam follower roller engaged therewith.

4. The improvement in the engine of claim 1, further comprising means for yieldingly mounting the cam follower rollers on the rotors for movement in a radial direction in relation to the axis of rotation of the rotors.

5. The improvement in the engine of claim 4, wherein each rotor comprises an annular rim extending concentrically about the axis of rotation, and said mounting means comprises a bearing ring arranged concentrically about the axis of rotation and yieldingly secured to the annular rotor rim.

6. The improvement in the engine of claim 1, further comprising piston rings on each of said pistons to seal the compartments from each other, and the rotor surface beneath each piston ring is undercut to define grooves permitting free circumferential expansion of the piston rings.

7. The improvement in the engine of claim 1, further comprising a pair of sealing rings on each side of each piston between the rotors and the engine block, and serrations adjacent the sealing rings and facing the toroidal chamber.

8. In a rotary four cycle internal combustion engine comprising a stationary engine block having an axis, a pair of mating rotors coaxially counted in the engine block for rotation in respect thereto, the engine block and the rotors together defining a toroidal chamber; a drive shaft extending transversely of the toroidal chamber and having an axis parallel to the axis of the engine block but being eccentric in relation thereto; a pair of diametrically opposite pistons fixed to each of said rotors and arranged for revolving movement in the toroidal chamber, the pistons subdividing the chamber into four compartments; a pair of diametrically opposite cam follower rollers fixed to each of said rotors and spaced angularly 90° from the pistons on the respective rotor; and a pair of identical cams fixed on the drive shaft, extending radially therefrom and so spaced along the shaft axis as to be in engagement with a respective one of the pairs of cam follower rollers, each cam having two diametrically extending axes perpendicular to each other and intersecting at the shaft axis, one cam axis being longer than the other cam axis, a concave index cam face and an ovate cam face opposite thereto along the longer cam axis, and two cam lobes opposite each other along the shorter cam axis, and the cams being angularly offset by 180° in respect of each other: the improvement of means for yieldingly mounting the cam follower rollers on the rotors for movement in a radial direction in relation to the axis of rotation of the rotors.

9. In a rotary four cycle internal combustion engine comprising a stationary engine block having an axis, a pair of mating rotors coaxially mounted in the engine block for rotation in respect thereto, the engine block and the rotors together defining a toroidal chamber; a drive shaft extending transversely of the toroidal chamber and having an axis parallel to the axis of the engine block but being eccentric in relation thereto; a pair of diametrically opposite pistons fixed to each of said rotors and arranged for revolving movement in the toroidal chamber, the pistons subdividing the chamber into four compartments; a pair of diametrically opposite cam follower rollers fixed to each of said rotors and spaced angularly 90° from the pistons on the respective rotor; and a pair of identical cams fixed on the drive shaft, extending radially therefrom and so spaced along the shaft axis as to be in engagement with a respective one of the pairs of cam follower rollers, each cam having two diametrically extending axes perpendicular to each other and intersecting at the shaft axis, one cam axis being longer than the other cam axis, a concave index cam face and an ovate cam face opposite thereto along the longer cam axis, and two cam lobes opposite each other along the shorter cam axis, and the cams being angularly offset by 180° in respect of each other: the improvement of piston rings on each of said pistons to seal the compartments from each other, and the rotor surface beneath each piston being undercut to define grooves permitting free circumferential expansion of the piston rings.

References Cited

UNITED STATES PATENTS

| | | | |
|---|---|---|---|
| 2,734,489 | 2/1956 | Tschudi | 123—11 |
| 3,221,716 | 12/1965 | Careddu | 11—11 |

RALPH D. BLAKESLEE, *Primary Examiner.*